(12) United States Patent
Graboski

(10) Patent No.: US 11,326,736 B2
(45) Date of Patent: May 10, 2022

(54) ROOF-MOUNTED EQUIPMENT ATTACHMENT SYSTEM

(71) Applicant: Timothy Michael Graboski, Deerfield Beach, FL (US)

(72) Inventor: Timothy Michael Graboski, Deerfield Beach, FL (US)

(*) Notice: Subject to any disclaimer, the term of this patent is extended or adjusted under 35 U.S.C. 154(b) by 203 days.

(21) Appl. No.: 16/592,472

(22) Filed: Oct. 3, 2019

(65) Prior Publication Data

US 2021/0102658 A1 Apr. 8, 2021

(51) Int. Cl.
  *F16M 13/02* (2006.01)
  *E04D 13/00* (2006.01)

(52) U.S. Cl.
  CPC ............ *F16M 13/02* (2013.01); *E04D 13/00* (2013.01)

(58) Field of Classification Search
  CPC .......... F16M 13/02; E04D 13/00; H02S 20/23
  USPC ....... 52/589.1, 590.1, 590.2, 27, 443, 126.6, 52/198, 199, 173.3, 710, 843
  See application file for complete search history.

(56) References Cited

U.S. PATENT DOCUMENTS

| | | | |
|---|---|---|---|
| 2,301,672 A * | 11/1942 | Akam | E04B 2/14 16/443 |
| 3,605,137 A * | 9/1971 | Stollenwerk | A61G 1/052 5/625 |
| 3,813,179 A * | 5/1974 | Priest | F16B 37/045 403/348 |
| 4,011,704 A | 3/1977 | O'Konski | |
| 4,015,374 A | 4/1977 | Epstein et al. | |
| 4,558,637 A | 12/1985 | Mason | |
| 4,599,684 A | 7/1986 | Lee | |
| D291,009 S * | 7/1987 | Weilow | D25/120 |
| 4,685,265 A | 8/1987 | Cooper | |
| 4,922,670 A | 5/1990 | Naka et al. | |
| 4,996,804 A | 3/1991 | Naka et al. | |
| 5,040,347 A * | 8/1991 | Valvis | E06B 3/68 29/445 |
| 5,072,557 A | 12/1991 | Naka et al. | |
| D326,140 S * | 5/1992 | Dekel | D23/267 |
| D356,283 S * | 3/1995 | Christensen | D12/223 |
| D365,888 S * | 1/1996 | Ishmael | D25/124 |
| 5,505,788 A | 4/1996 | Dinwoodie | |
| 5,507,077 A * | 4/1996 | Kotajima | H02G 3/263 24/669 |
| 5,592,794 A * | 1/1997 | Tundaun | E04B 1/6162 52/220.7 |
| 5,593,348 A | 1/1997 | Rickert | |
| 5,651,226 A | 7/1997 | Archibald | |

(Continued)

FOREIGN PATENT DOCUMENTS

| | | | |
|---|---|---|---|
| DE | 20217489 U1 | 2/2003 | |
| DE | 102005053639 B4 * | 8/2007 | ............. F24S 25/61 |

(Continued)

*Primary Examiner* — Kimberly T Wood
(74) *Attorney, Agent, or Firm* — GableGotwals

(57) ABSTRACT

An attachment system for roof-mounted equipment of this disclosure includes a pedestal having rails and corresponding channels at a top and bottom wall surface, the rails and channels located below the bottom wall surface configured to receive an adhesive for mounting the pedestal to a roof structure without penetrating the roof, the rails and channels located below the top wall surface including at least one channel configured to accept a fastener of the piece of equipment to be mounted on the pedestal.

13 Claims, 3 Drawing Sheets

(56) References Cited

U.S. PATENT DOCUMENTS

| | | | | |
|---|---|---|---|---|
| 5,746,325 A | * | 5/1998 | Lee | G11B 23/0236 |
| | | | | 211/40 |
| 5,775,046 A | * | 7/1998 | Fanger | A47B 81/06 |
| | | | | 108/157.16 |
| 5,864,997 A | * | 2/1999 | Kelly | E04C 3/32 |
| | | | | 52/584.1 |
| 5,947,817 A | | 9/1999 | Morris et al. | |
| 6,164,021 A | | 12/2000 | Huber et al. | |
| 6,195,953 B1 | * | 3/2001 | Gitter | E04C 3/06 |
| | | | | 52/843 |
| 6,537,147 B2 | | 3/2003 | Smith | |
| 6,647,675 B1 | | 11/2003 | Castellanos | |
| 6,773,341 B2 | | 8/2004 | Cedergreen et al. | |
| 6,918,217 B2 | | 7/2005 | Jakob-Bamberg et al. | |
| 6,966,156 B2 | | 11/2005 | Dixon | |
| 6,997,800 B1 | | 2/2006 | Kohler | |
| RE39,097 E | | 5/2006 | Schilham | |
| 7,383,670 B1 | * | 6/2008 | Meyers | E04F 13/081 |
| | | | | 156/71 |
| 7,384,331 B2 | | 6/2008 | Coulton | |
| 7,485,034 B2 | | 2/2009 | Sells | |
| 7,546,716 B1 | * | 6/2009 | Asadurian | E04C 1/395 |
| | | | | 52/282.1 |
| 7,739,840 B1 | | 6/2010 | Castellanos | |
| 7,774,990 B1 | | 8/2010 | Castellanos | |
| D649,434 S | | 11/2011 | Lalancette et al. | |
| 8,104,231 B1 | * | 1/2012 | Graboski | E04D 1/3402 |
| | | | | 52/41 |
| 8,516,775 B2 | | 8/2013 | Scheckler | |
| 8,615,954 B1 | * | 12/2013 | Graboski | F24S 20/67 |
| | | | | 52/589.1 |
| 8,733,037 B2 | | 5/2014 | Bindschedler et al. | |
| D792,017 S | * | 7/2017 | Klus | D26/138 |
| 10,816,240 B2 | * | 10/2020 | Robinson | F24S 25/13 |
| 2003/0140582 A1 | | 7/2003 | Sells | |
| 2006/0223436 A1 | | 10/2006 | Matyja | |
| 2007/0094948 A1 | | 5/2007 | Osborne et al. | |
| 2008/0216442 A1 | | 9/2008 | Shubin | |
| 2008/0250743 A1 | | 10/2008 | Exposito | |
| 2008/0256887 A1 | | 10/2008 | Exposito | |
| 2009/0163134 A1 | | 6/2009 | Peck | |
| 2010/0313506 A1 | * | 12/2010 | Schoell | F24S 25/20 |
| | | | | 52/302.1 |
| 2011/0302857 A1 | * | 12/2011 | McClellan | F24S 25/35 |
| | | | | 52/173.3 |
| 2017/0302221 A1 | * | 10/2017 | Jasmin | H02S 30/10 |

FOREIGN PATENT DOCUMENTS

| | | | | |
|---|---|---|---|---|
| DE | 202009011708 | | 2/2010 | |
| EP | 2242112 A2 | | 10/2010 | |
| ES | 2377418 T3 | * | 3/2012 | F16B 7/0493 |
| JP | 2000154619 A | | 6/2000 | |
| JP | 2003035016 A | * | 2/2003 | F24S 25/35 |
| JP | 2008208618 A | | 9/2008 | |
| WO | 2019040003 A1 | | 2/2019 | |

\* cited by examiner

ROOF-MOUNTED EQUIPMENT ATTACHMENT SYSTEM

BACKGROUND

This disclosure relates generally to attachment systems for roof-mounted products such as, but not limited to, solar panels and HVAC equipment. More specifically, the disclosure addresses attachment systems that do not penetrate the roof decking with mechanical fasteners and are well-suited to meet or exceed building codes designed to prevent or minimize roof damage due to high winds (e.g. Dade County, Fla. building code).

SUMMARY

Embodiments of an attachment system or mounting pedestal of this disclosure include a longitudinally extending rigid member with angled sidewalls, an optional central passageway, and a plurality of channels or rails, a lower set of channels or rails extend below the bottom wall surface and an upper set of channels or rails are recessed from the top wall surface. The channels or rails may extend an entire length of the rigid member. In some embodiments, the number of lower channels is greater than that of the upper channels. The lower set of channels may have a same width and depth as one another and the upper set of channels may differ in width and depth from one another. A center channel of the upper set may be sized to receive the head of a bolt or fastener for connection to the equipment. The lower set of channels or rails provide spacing and depth so that an adequate amount of foam adhesive resides between the bottom wall surface and the roof deck. The rails provide a flange that provides additional surface area for bonding to the adhesive. As the foam adhesive expands it surrounds the rails and enters the channels. Once the adhesive cures, the rigid member is securely affixed to the roof without the need for mechanical fasteners to penetrate the roof decking.

DETAILED DESCRIPTION

Figure 2:
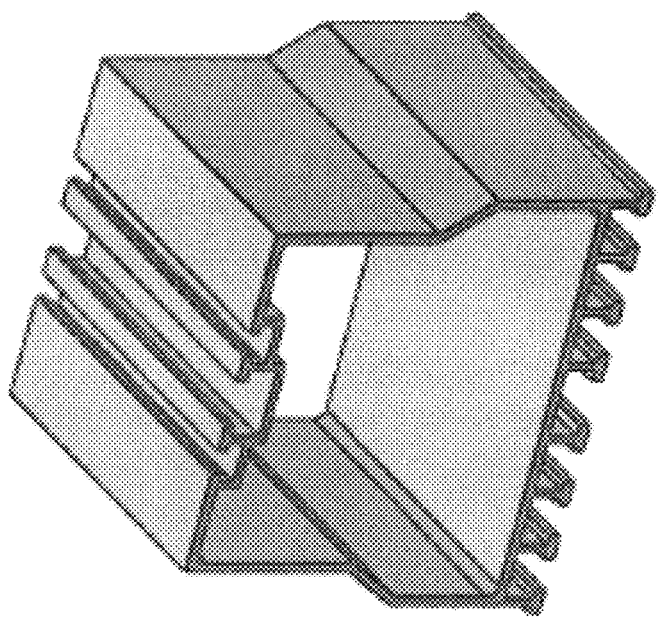
FIG. 2 is an isometric view of the mount of FIG. 1. The lower set of channels or rails extend an entire length of the mount, as does the upper set of channels or rails.
Figure 1:
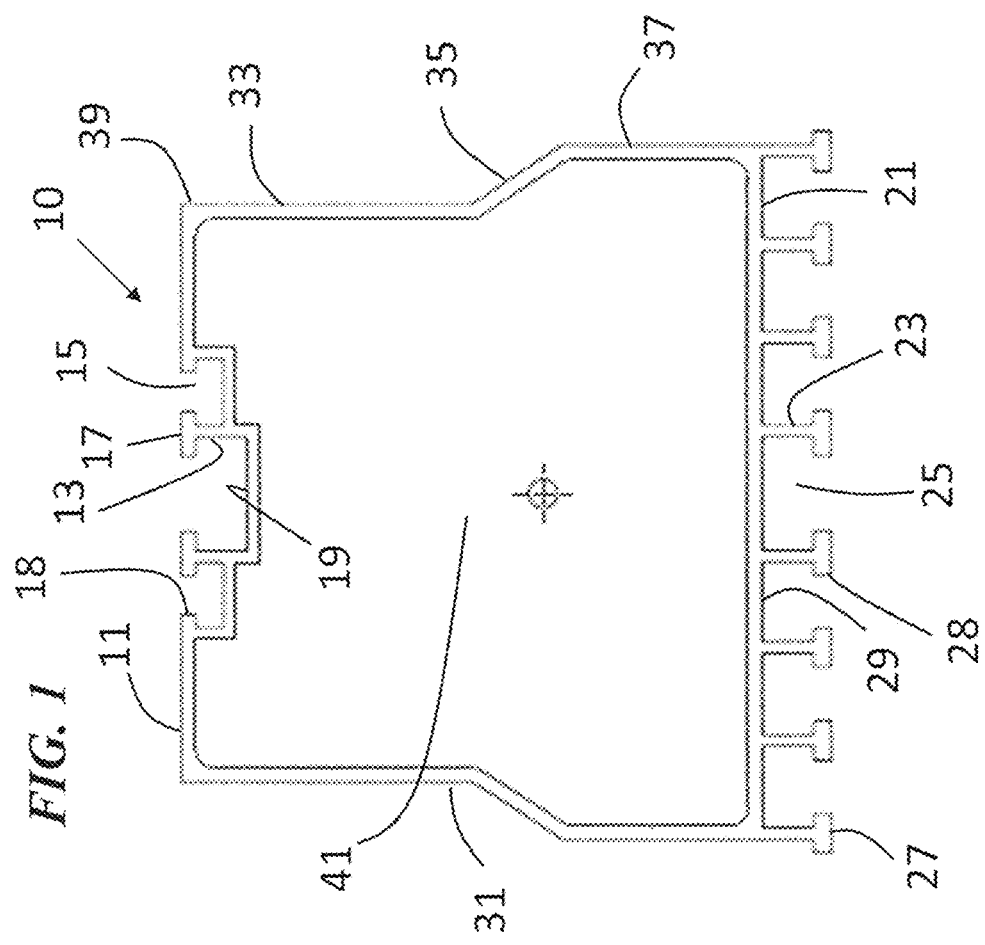
FIG. 1 is a front (or rear) elevation view of an embodiment of a standard (non-angled top wall surface) mount of this disclosure. The left and right side elevation views are mirrors of one another.
Figure 3:
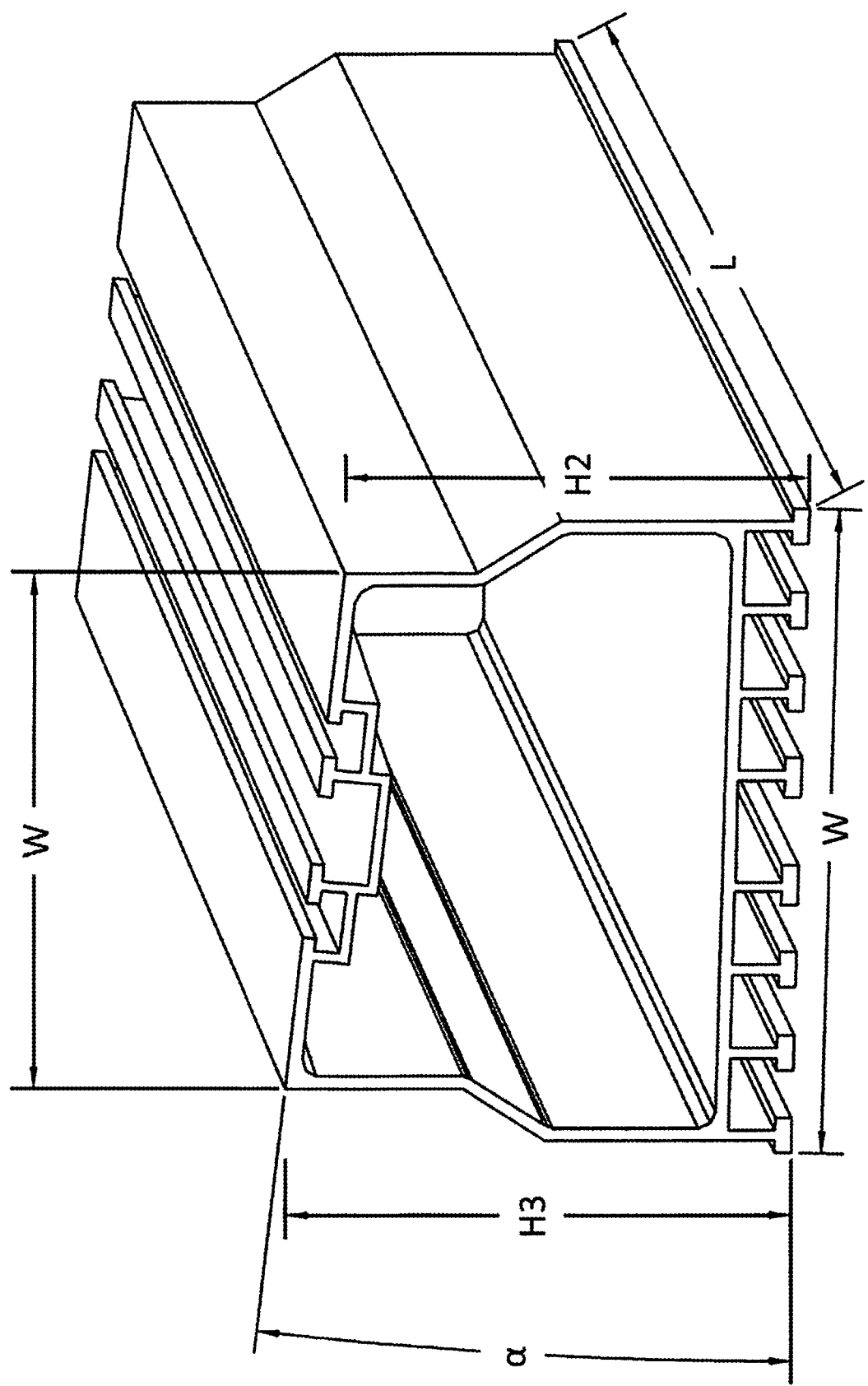
FIG. 3 is an isometric view of an embodiment of a profiled (5° angled top wall surface) mount of this disclosure. In embodiments, the angle may be in a range of 5° to 15° with the left and right sides differing in height accordingly. The front and rear elevation views are mirrors of one another. The lower set of channels or rails extend an entire length of the mount, as does the upper set of channels or rails.
Figure 4:
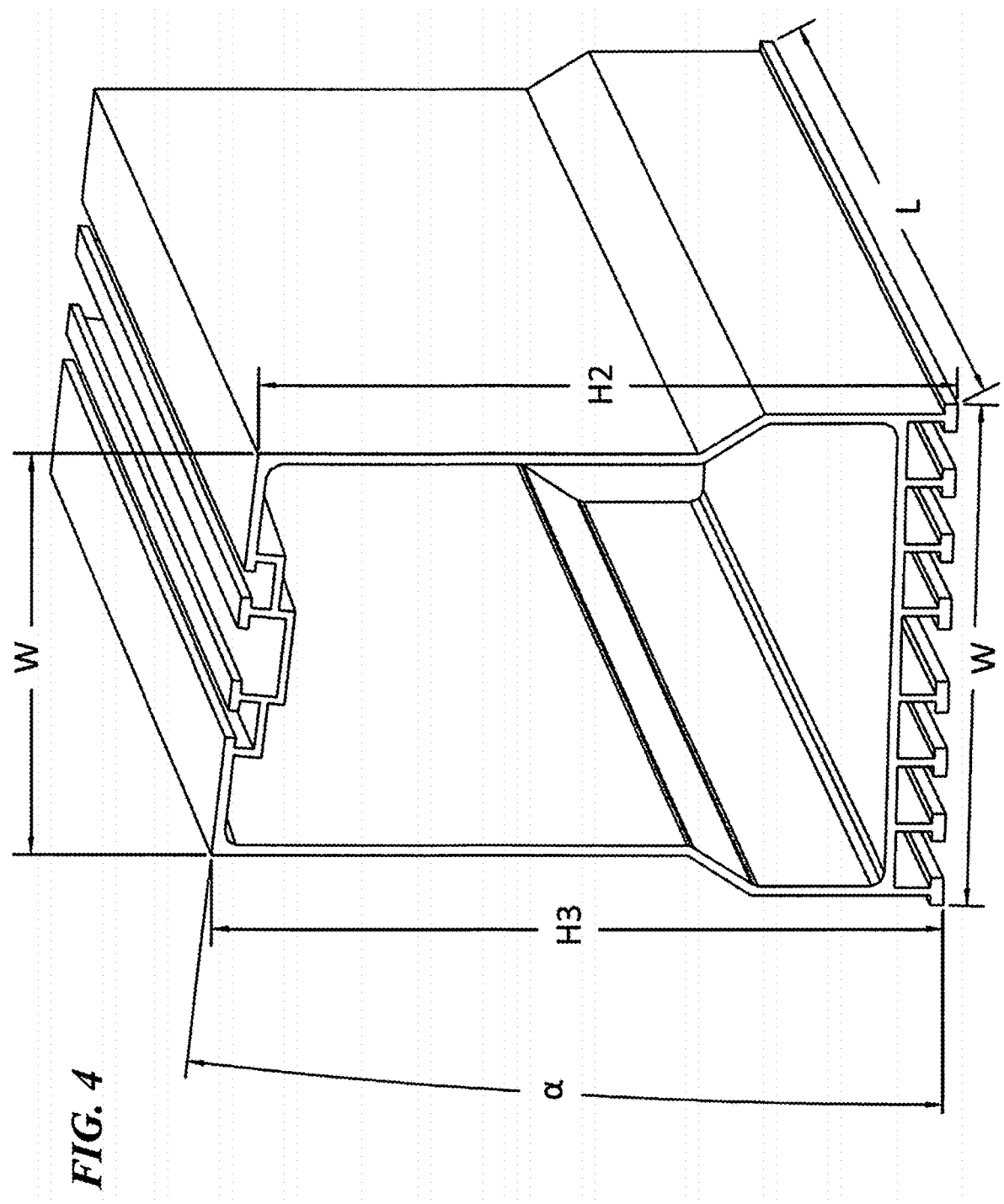
FIG. 4 is an isometric view of a profiled mount of this disclosure having a greater height than that of the mount of FIG. 3. The width, length, and height of the mount may be any width, length, and height suitable to safely support the piece of equipment to be mounted and provide an appropriate amount of clearance between the bottom end of the equipment and the roof.

Referring to the drawings, an attachment system or mounting pedestal of this disclosure includes a longitudinally extending rigid member 10 having a top wall 11, a bottom wall 21, and side walls 31 including an upper and a lower straight wall portion 33, 37 and an angled portion 35 located in between. The walls 11, 21, 31 may form a central passageway 41 extending the length of the rigid member 10 and used to house wiring, cabling, or insulation. The rigid member 10 may an extruded polymer member or a metal member.

The bottom wall surface 21 provides a solid wall surface from which a set of rails 23 extend to form channels 25 between adjacent rails 23. This set of rails 23 and channels 25 may extend an entire length of the rigid member 10. Flanges 27 located at the lower end 29 of the rail 23 provide feet or additional surface area to contact foam adhesive used to mount the member 10 to the roof. The upper end 29 of the channel 25 is closed by the bottom wall 21. The lower end 28 of the channel is an open end. The channels 25 may be of uniform or differing width and depth.

Another set of rails 13 and channels 15 are located along the top wall 11, with the channels 15 being recessed from the top wall surface 11. Flanges 17 at the upper end 18 of the rails 13 form a part of the top wall surface 11. This set of rails 13 and channels 15 also may extend an entire length of the rigid member 10. The lower end 19 of the channel 15 is closed, the upper end 18 is open, flush with the top wall surface 11. The channels 15 may be of uniform or differing width and depth. One of the channels 15, which can be the center channel, may be sized to receive a fastener of a piece of equipment to be mounted to the top wall. The center channel 15 can have greater depth and width than the other channels 15.

In embodiments, the top wall 11 may be a horizontal top wall, arranged at 90° to each upper end 39 of each sidewall 31. In other embodiments, the top wall 11 may be arranged at an angle to the sidewalls 31. The angle may be in a range of 5° to 15° with the left and right sides differing in height accordingly.

In embodiments, there are more bottom rails 23 and channels 25 than there are top rails 13 and channels 15. There may be at least twice as many bottom channels 25 than top channels 15 (e.g. seven bottom channels and three top channels). The bottom rails 23 may form an even number of flanges 27 and, therefore, an odd number of channels 25. For example, there may be eight flanges 27 and seven channels 25, the number of channels 25 always being one less than the number of flanges 27. The flanges 27 may have a uniform width. Similarly, the top rails 13 may form an even number of flanges 17 and an odd number of channels 15. There may be four flanges 17 and three channels 15, the number of channels 15 always being one less than the number of flanges 17. One of the channels 15 is the center channel. The center channel can be deeper, wider, or deeper and wider than the other channels. The flanges 17 may have different width, the outermost two of the flanges 17 being wider than the flanges 17 inward of these outermost two.

While embodiments of this disclosure have been described with a certain degree of particularity, many changes may be made in the details of construction and the arrangement of components without departing from the spirit and scope of this disclosure. A system and method of this disclosure, therefore, is limited only by the scope of the attached claims, including the full range of equivalency to which each element thereof is entitled.

What is claimed:

1. A pedestal for mounting a piece of equipment above a roof, the apparatus comprising:

the pedestal having a topmost wall surface, a bottommost wall surface, and sidewall surfaces extending an entire distance between the topmost and bottommost wall surfaces, the sidewall surfaces including at least one angled portion, each sidewall surface above and below the angled portion being at right angles to a corresponding one of the topmost and bottommost wall surfaces, the pedestal being wider below the angled portion than above the angled portion;

a plurality of bottom rails extending along and outward of the bottommost wall surface, the bottom rails including a bottom flange at a lower end and forming a bottom channel between adjacent bottom rails, an upper end of each bottom channel being closed by the bottommost wall surface, a lower end of the each bottom channel being open;

a plurality of top rails extending along and inward of the topmost wall surface, the top rails including a top flange at an upper end forming a portion of the topmost wall surface and forming a top channel between adjacent top rails, an upper end of each top channel being open, a lower end being closed, each top channel being recessed relative to the topmost wall surface, one top channel having a greater depth, a greater width, or a greater depth and width than all other top channels;

wherein the plurality of bottom rails is more than the plurality of top rails;

wherein no mechanical fasteners are needed to secure the pedestal to the roof.

2. The pedestal of claim 1, wherein, the topmost wall surface is parallel to the bottommost wall surface.

3. The pedestal of claim 1, wherein, the topmost wall surface is oriented at an angle relative to horizontal different than that of the bottommost wall surface.

4. The pedestal of claim 3, wherein, the angle is 5°.

5. The pedestal of claim 3, wherein, the angle is in a range of 5° to 15°.

6. The pedestal of claim 1, wherein, the plurality of top rails form an even number of top flanges and an odd number of top channels.

7. The pedestal of claim 6, wherein, the even number of top flanges is four and the odd number of top channels is three.

8. The pedestal of claim 6, wherein, an outermost two of the even number of top flanges are wider than top flanges inward of the outermost two.

9. The pedestal of claim 1, wherein, the plurality of bottom rails form an even number of bottom flanges and an odd number of bottom channels.

10. The pedestal of claim 1, wherein, all bottom channels have a same depth.

11. The pedestal of claim 1, wherein, all bottom channels have a same width.

12. The pedestal of claim 1, wherein, a total number of bottom channels is at least twice that of a total number of top channels.

13. The pedestal of claim 1, further comprising, a central passageway located between the sidewall surfaces and extending an entire length of the pedestal.

* * * * *